United States Patent
Ye (10) Patent No.: US 8,561,192 B2
(45) Date of Patent: Oct. 15, 2013

(54) METHOD AND APPARATUS FOR AUTOMATICALLY PROTECTING A COMPUTER AGAINST A HARMFUL PROGRAM

(75) Inventor: Chao Ye, Beijing (CN)

(73) Assignees: Beijing Rising Information Technology Co., Ltd., Beijing (CN); Beijing Rising International Software Co., Ltd., Beijing (CN)

( * ) Notice: Subject to any disclaimer, the term of this patent is extended or adjusted under 35 U.S.C. 154(b) by 687 days.

(21) Appl. No.: 12/738,023

(22) PCT Filed: Oct. 15, 2008

(86) PCT No.: PCT/CN2008/072694
§ 371 (c)(1),
(2), (4) Date: Aug. 13, 2010

(87) PCT Pub. No.: WO2009/049554
PCT Pub. Date: Apr. 23, 2009

(65) Prior Publication Data
US 2010/0313269 A1    Dec. 9, 2010

(30) Foreign Application Priority Data

Oct. 15, 2007  (CN) .......................... 2007 1 0180317

(51) Int. Cl.
*G06F 21/00*    (2013.01)
(52) U.S. Cl.
USPC ......................................................... 726/24
(58) Field of Classification Search
USPC ......................................................... 726/24
See application file for complete search history.

(56) References Cited

U.S. PATENT DOCUMENTS

| 7,694,134 | B2 | 4/2010 | Witt et al. |
| 2002/0077803 | A1* | 6/2002 | Kudoh et al. ..................... 704/1 |
| 2004/0010718 | A1 | 1/2004 | Porras et al. |
| 2004/0049693 | A1 | 3/2004 | Douglas |
| 2004/0193912 | A1 | 9/2004 | Li et al. |
| 2006/0075494 | A1 | 4/2006 | Bertman et al. |
| 2006/0136720 | A1* | 6/2006 | Armstrong et al. ........... 713/164 |
| 2007/0107052 | A1 | 5/2007 | Cangini et al. |

(Continued)

FOREIGN PATENT DOCUMENTS

| CN | 1409222 A | 4/2003 |
| CN | 1550950 A | 12/2004 |

(Continued)

OTHER PUBLICATIONS

International Search Report corresponding to International Application No. PCT/CN2008/072694 dated Jan. 22, 2009.

(Continued)

*Primary Examiner* — Michael S McNally
(74) *Attorney, Agent, or Firm* — Jenkins, Wilson, Taylor & Hunt, P.A.

(57) ABSTRACT

The present invention discloses a method and apparatus for automatically protecting computers against harmful programs. The method comprises: restricting an object program from accessing some resources in a computer system based on predetermined resource access rules; scanning computer resources accessed by the object program to determine whether the accessed computer resources are infected by the object program; and analyzing malicious behaviors based on behavior characteristics of the object program to determine whether the object program is a harmful program.

12 Claims, 8 Drawing Sheets

(56) References Cited

U.S. PATENT DOCUMENTS

| | | |
|---|---|---|
| 2007/0150956 A1 | 6/2007 | Sharma et al. |
| 2007/0209076 A1 | 9/2007 | Porter et al. |
| 2010/0293615 A1 | 11/2010 | Ye |
| 2010/0306851 A1 | 12/2010 | Zhou |

FOREIGN PATENT DOCUMENTS

| | | |
|---|---|---|
| CN | 1581088 | 2/2005 |
| CN | 1818823 | 8/2006 |
| CN | 1845120 | 10/2006 |
| CN | 1885224 | 12/2006 |
| EP | 1630711 A1 | 3/2006 |
| WO | WO 02/14987 | 2/2002 |
| WO | WO 02/061510 | 8/2002 |
| WO | WO2009/049554 | 4/2009 |
| WO | WO2009/049555 | 4/2009 |
| WO | WO2009/049556 | 4/2009 |

OTHER PUBLICATIONS

International Search Report corresponding to International Application No. PCT/CN2008/072699 dated Jan. 22, 2009.

International Search Report corresponding to International Application No. PCT/CN2008/072698 dated Feb. 19, 2009.

Office Action corresponding to U.S. Appl. No. 12/738,031 dated Mar. 29, 2012.

Office Action corresponding to U.S. Appl. No. 12/738,037 dated Apr. 12, 2012.

Office Action corresponding to U.S. Appl. No. 12/738,037 dated Aug. 24, 2012.

Office Action corresponding to U.S. Appl. No. 12/738,031 dated Aug. 24, 2012.

European Search Report corresponding to European Patent Application No. EP 1 630 711 dated Jan. 3, 2006.

\* cited by examiner

METHOD AND APPARATUS FOR AUTOMATICALLY PROTECTING A COMPUTER AGAINST A HARMFUL PROGRAM

FIELD OF THE INVENTION

The present invention relates to a method and apparatus for automatically protecting a computer against a harmful program, and more particularly, to a method and apparatus for automatically protecting computers against harmful programs including such functions as resource access rule control, resource access scanning, malicious behavior analysis, etc.

BACKGROUND

The rapid development of computer and network technologies greatly facilitates information interaction. However, with the development of these technologies, computer viruses are being evolved and updated continuously and become a serious threat to normal uses of computers. Therefore, how to protect a computer against viruses has become a focus of people's interest. An important step for protecting computers against viruses is to recognize viruses before running the file, which is usually called virus scanning, therefore appropriate measures may be taken to protect computer systems from being infected by viruses.

A virus scanning method commonly adopted by prior anti-virus software is signature matching method, which uses signatures (which are typically one or more segments of specific binary code stream) extracted from virus samples to perform matching in the scanning files. Since the signatures used in this method are extracted from the erupted or detected virus samples, they are fixed signatures and usually lag behind viruses. Thus, such method can not work in real-time monitoring and protection against those viruses in which the signatures are prone to change (i.e., the viruses prone to mutate) or new viruses (i.e., the viruses from which the signatures have not been extracted). Particularly in recent years, with an increasing number of viruses and the emergence and development of anti-anti-virus technologies, the disadvantage of lagging in the traditional "signature scanning" appears more and more serious, thereby resulting in many viruses being unable to be detected in real time. Once these real-timely undetected viruses run, computer resources will be completely exposed to computer viruses and be arbitrarily read or destroyed by them. Furthermore, as virus samples in the traditional "signature scanning" are usually required to be updated manually, they can not be added timely and automatically. Such that the problem of lagging in traditional "signature scanning" is more serious.

In order to overcome the problem of lagging in the traditional "signature scanning" and prevent the running of computer viruses from tampering or destroying sensitive resources, there is a need for a new method and apparatus for automatically protecting computers against harmful programs.

SUMMARY

An object of the present invention is to provide a computer automatic protection method capable of actively recognizing and killing unknown viruses in an accurate and timely manner, while protecting security of the computer real-timely and actively by updating restriction rules without user's participation.

In order to achieve this object, the method in accordance with the present invention comprises: restricting an object program from accessing some resources in a computer system based on predetermined resource access rules; scanning computer resources accessed by the object program to determine whether the accessed computer resources are infected by the object program; and analyzing malicious behaviors based on behavior characteristics of the object program to determine whether the object program is a harmful program.

The present invention also provides a computer automatic protection apparatus for implementing the above-described method comprises: a resource access rule control module for restricting an object program from accessing some resources in a computer system based on predetermined resource access rules; a resource access scanning module for scanning computer resources accessed by the object program to determine whether the accessed computer resources is infected by the object program; and a malicious behavior analyzing module configured to analyze malicious behaviors based on behavior characteristics of the object program to determine whether the object program is a harmful program.

BRIEF DESCRIPTION OF THE DRAWINGS

The present invention will be described in detail in conjunction with the accompanying drawings and specific embodiments, where.

The like reference numbers refer to like or corresponding features or functions throughout.

DETAILED DESCRIPTION

The embodiments of the present invention will be described in detail with reference to the accompanying drawings.

Figure 1:
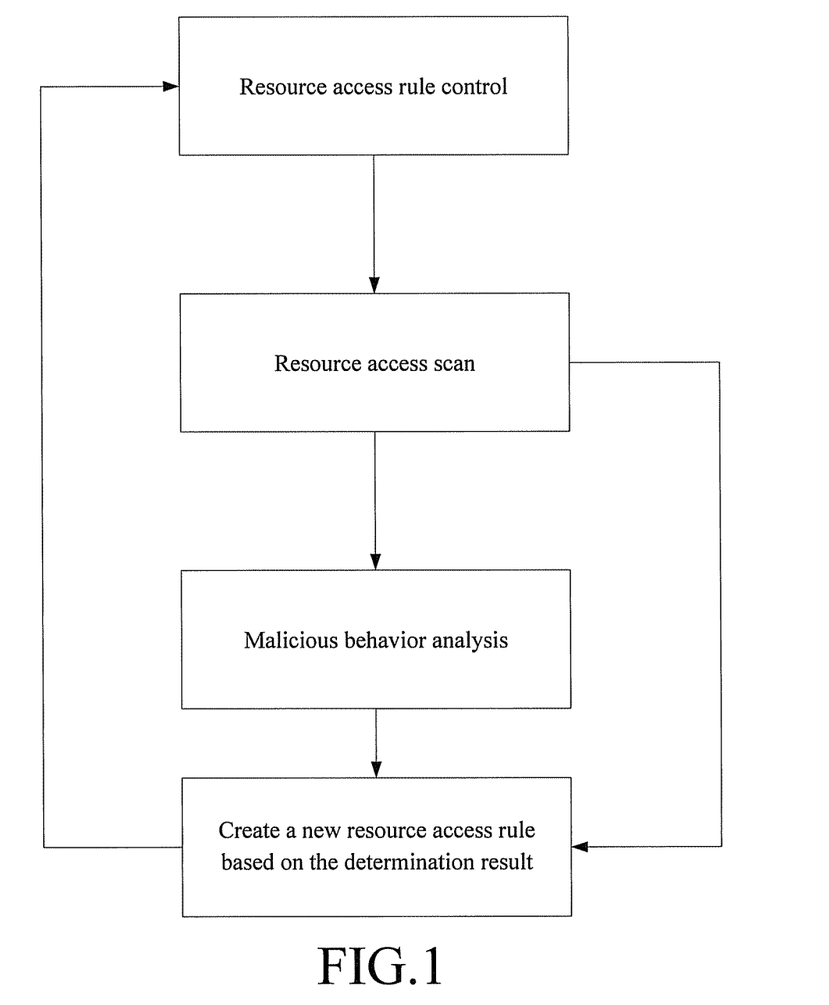
FIG. 1 illustrates a schematic diagram of an architecture of a computer automatic protection method in accordance with the present invention.

FIG. 1 illustrates a schematic diagram of an architecture of a computer automatic protection method in accordance with the present invention. As shown in FIG. 1, the computer automatic protection method in accordance with the present invention includes a three-layer structure in total from top to bottom: the first layer is resource access rule control processing, the second layer is resource access scan processing, and the third layer is malicious behavior analysis processing.

Such three-layer structure combines the malicious behavior analysis and the resource access control with the traditional virus scanning method such that a malicious program can be detected in an accurate and fleet manner, and the running thereof can be prevented timely.

In the following, specific functions and components of the three-layer structure will be summarized respectively.

Resource Access Rule Control Processing

Resource access rule control processing is the first layer structure, which is the most basic section of the computer protection method in accordance with the present invention, because the running of a program often starts from resource access, for example, it is necessary for an object program to access an object file for starting the corresponding process of the object file.

In order to prevent malicious programs from making an attack or transmitting viruses by the utilization of system resources, e.g., by accessing a file or registry or calling a specific system API function, some resource access rules are predetermined in the first layer structure. These predetermined resource access rules are used for preventing portions of important resources in the system from being illegally accessed. These predetermined resource access rules, including file access rule control, process start control, registry access rule control, system action rule control, etc, may be summarized and generated based on analyzing numerous cases of infected users.

Specifically, upon running, the resource access rule control processing firstly intercepts a request of an object program for accessing system resources, and then determines, based on the predetermined resource access rules, whether the object program is to access resources which are determined by the predetermined resource access rules as resources required to be accessed and confirmed. If the determination result is Yes, then it is indicated that the current object program violates the resource access rules and may be a harmful program, such as Trojan, a virus, etc, and a query is required to check the legality of this resource access.

The resource access rule control processing may restrict a certain program before it accesses or executes a harmful program, or may restrict an executed harmful program when the executed harmful program accesses sensitive resources. Thus, such resource access rule control processing is able to timely prevent the harmful program before it implements infringement, thereby the purpose of resisting attack of unknown viruses is achieved.

Resource Access Scan Processing

The second layer structure-resource access scan processing is further performed on the basis of the resource access rule control processing. The resource access scan processing is a traditional real-time monitor, which depends on virus scanning and recognizing technologies, mainly for monitoring resources accessed by an object program, such as a file, boot sector, mail, script, etc. For example, the resource access scan processing scans and recognizes viruses with regard to the intercepted context (e.g., file content, boot sector content, etc.) accessed by the object program to determine whether the content accessed by the object program is infected by viruses in the object program, thus determining whether the object program is a harmful program.

Since the second layer structure adopts an accurate virus scanning and recognition method, the determination result derived therefrom is reliable. In addition, in certain special cases, the resource access scan processing may be omitted. For example, when the object program only takes certain actions to attack the system, the effect on a file may be not involved such that the resource access scan processing can be omitted.

Malicious Behavior Analysis Processing

Malicious behavior analysis processing, as the third layer structure, determines whether the object program is harmful by monitoring the action of the object program on the basis of the two layers described above and based on the behavior performance (i.e., behavior characteristics) thereof. For example, when the object program implements self-replication and sets a global hook, the object program is determined to be harmful. Because the malicious behavior analysis makes the determination based on the behavior characteristics, it is able to recognize some unknown viruses. However, such analysis and determination have certain inaccuracies.

Preferably, in order to avoid false alarm by the malicious behavior analysis, a malicious behavior analysis technology may be combined with a virus "DNA" recognition technology in the third layer structure. The virus "DNA" recognition technology is a technology which extracts characteristic sequences of unknown viruses by adopting a specific characteristic discovery method, then compares them with known virus characteristics and finally finds the characteristic sequence with maximum similarity and greater than a specific threshold. A file corresponding to the found characteristic sequence is determined to be harmful. Specifically, in the third layer structure, after the analysis of malicious behaviors, a malicious program which is determined by analyzing the malicious behaviors may be confirmed again as needed using the virus "DNA" recognition technology. The object program is determined to be harmful only when both the determination result of the malicious behavior analysis and the determination result of the virus "DNA" recognition technology are harmful. Thus, unknown viruses can be discovered by the malicious behavior analysis while false alarm can be prevented by means of the virus "DNA" recognition technology, thereby decreasing false alarm rate.

The three-layer structure of the computer automatic protection method in accordance with the present invention is described hereinabove in conjunction with FIG. 1. Furthermore, on the basis of the above three-layer structure, the present invention also comprises a procedure of automatically updating resource access rules based on the determination result from the second layer and/or the third layer. In the automatic updating procedure, a new resource access rule is created based on the determination result of the resource access scan processing and/or malicious behavior analysis processing and it is automatically updated to resource access control layer. The specific procedure of automatically updating the resource access rules will be described in detail below with reference to the figures.

In general, the computer automatic protection method in accordance with the present invention will be automatically running in the system to monitor the running of programs in a real time manner. However, a usecase can perform virus scanning in a non real-time manner by manually starting a scanning program. It is possible that the manual scanning initiated by the user discovers virus files or files infected by viruses which have been disabled but not yet killed, and then kills these files timely. At this point, the virus files discovered by manual scanning may be accessed due to not being killed timely, so the present invention also proposes a new resource access rule being created based on the determination result of manual scanning, and the new resource access rule is automatically updated to the resource access control layer.

The structure and some functions of the computer automatic protection method in accordance with the present invention are described above generally. Various aspects of the present invention will be described separately in conjunction with specific embodiments.

Figure 2:
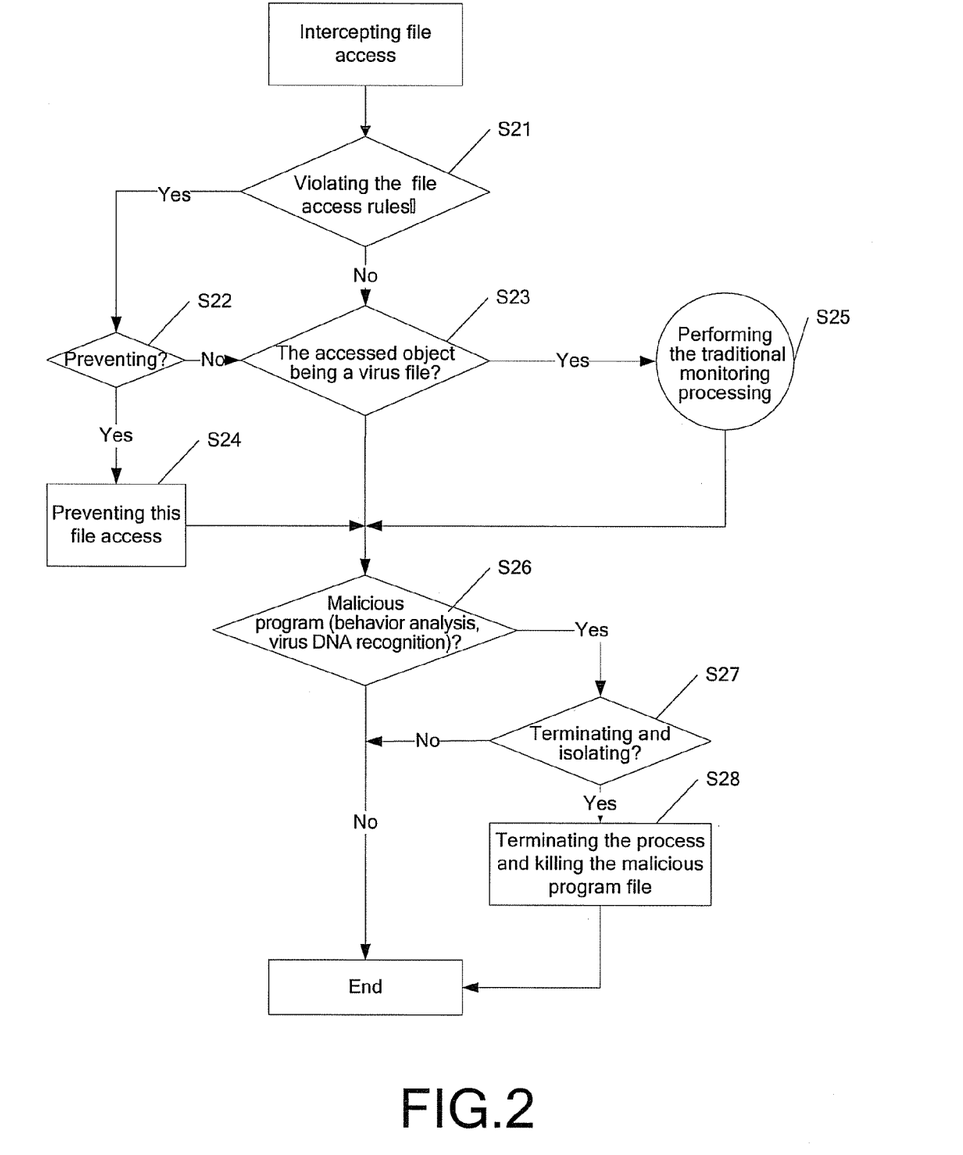
FIG. 2 illustrates a flow chart of a computer automatic protection method in accordance with an embodiment of the present invention when an object program attempts to access a file.

FIG. 2 illustrates a flow chart of a computer automatic protection method in accordance with an embodiment of the present invention when an object program attempts to access a file.

As shown in FIG. 2, after the object program that initiates file access (e.g., attempts access a system file) is intercepted, the resource access rule control processing of the first layer determines whether the file access violates a file access rule in the resource access rules in step S21, for example, write access to important data files (e.g., a host file) of the system is prohibited. If the file access violates the file access rule, then the procedure proceeds to step S22; otherwise, it proceeds to step S23.

In step S22, the user is prompted whether to prevent this file access to prevent the object program from further infringing its accessed files. If the user does not prevent this file access, the procedure proceeds to step S23. If the user prevents this file access, the procedure proceeds to step S24, in which this file access is prevented. Then the procedure proceeds to step S26, in which the malicious behavior analysis is preformed next.

If it is determined that the file access rule is not violated in step S21 or it is determined that the current object program is not needed to be prevented from accessing in step S22, the object program is allowed to access, e.g., the system file. Then in step S23, the resource access scan processing of the second layer scans resources for the object accessed by the object program to determine whether the accessed object is infected by viruses in the object program. When the determination result shows that the accessed object is infected, the procedure proceeds to step S25, in which the traditional monitoring processing is performed, and then proceeds to step S26. When the determination result shows that the accessed object is not infected, the procedure also proceeds to step S26, in which the malicious behavior analysis is performed next.

In step S26, the malicious behavior analysis processing analyzes malicious behaviors for this file access to determine whether the object program may be a harmful program. In step S26, in order to avoid false alarm, when the object program is determined to be a harmful program by the malicious behavior analysis, it is scanned and determined again as needed using the virus "DNA" recognition technology to determine whether the object program is harmful. The object program is determined to be harmful only when both determination results are Yes.

If the determination result of step S26 is No, the procedure ends. Otherwise, it is further determined whether the object program is required to be terminated and isolated (step S27), and the object program is terminated and isolated as needed (step S28), and then the procedure ends.

Figure 3:
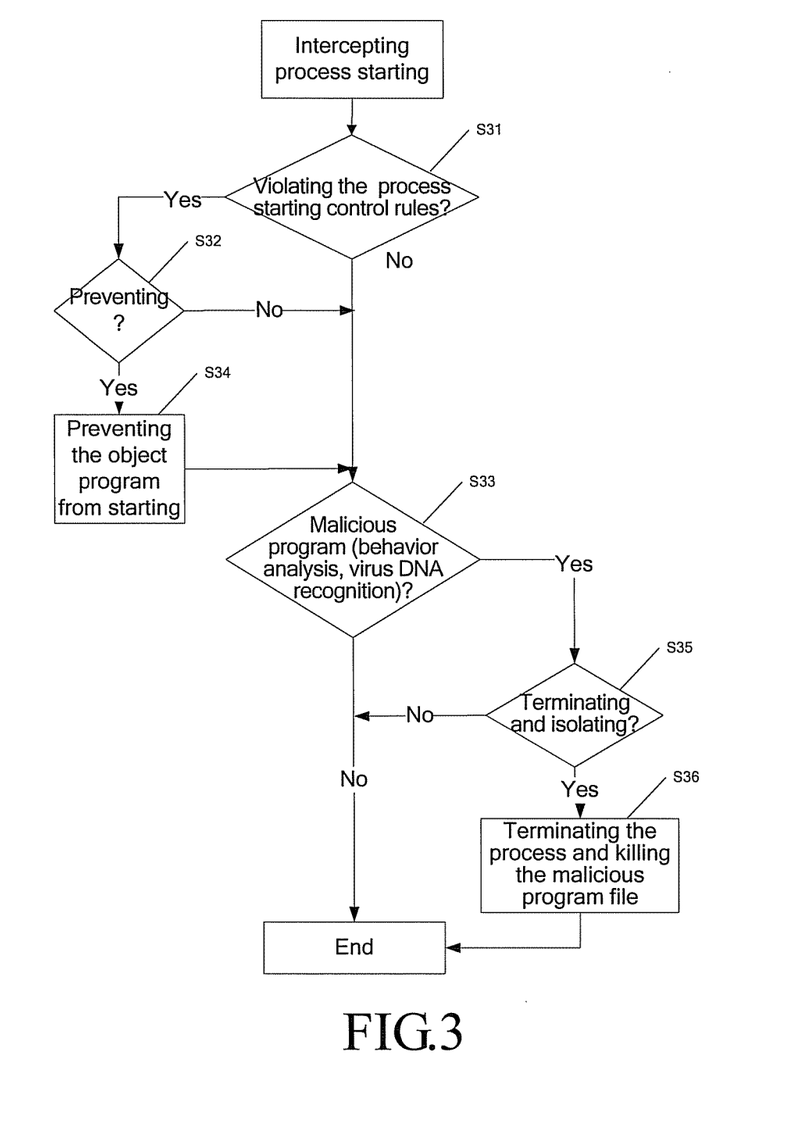
FIG. 3 illustrates a flow chart of a computer automatic protection method in accordance with an embodiment of the present invention when an object program attempts to start a process.

FIG. 3 illustrates a flow chart of a computer automatic protection method in accordance with an embodiment of the present invention when an object program attempts to start a process.

As shown in FIG. 3, after the object program that initiates a process starting action is intercepted, in step S31, the resource access rule control processing of the first layer determines whether the process starting violates a process starting rule in resource access rules, for example, an unknown process is prohibited from being started under a browser process. If the file access violates the process starting rule, the procedure proceeds to step S32, in which it is further determined whether this process creating is prevented (step S34); otherwise, it proceeds to step S33, in which the malicious behavior analysis is performed next.

In step S32, the user is prompted whether to prevent this process from starting in order to prevent the started process from performing further infringement behaviors. If the user prevents this process from starting, the procedure proceeds to step S34, in which the process is prevented from starting. Then the procedure proceeds to step S33, in which the malicious behavior analysis is performed next, regardless of whether the user preventing this process from starting.

In step S33, the malicious behavior analysis processing of the third layer analyzes malicious behaviors for this file access to determine whether the object program may be a harmful program. In step S33, in order to avoid false alarm, the object program is also scanned and determined again as needed using the virus "DNA" recognition technology to determine whether the object program is harmful. The object program is determined to be harmful only when both determination results are Yes.

If the determination result of step S33 is No, the procedure ends. Otherwise, it is further determined whether the object program is required to be terminated and isolated (step S35), and the object program is terminated and isolated as needed (step S36), and then the procedure ends.

Figure 4:
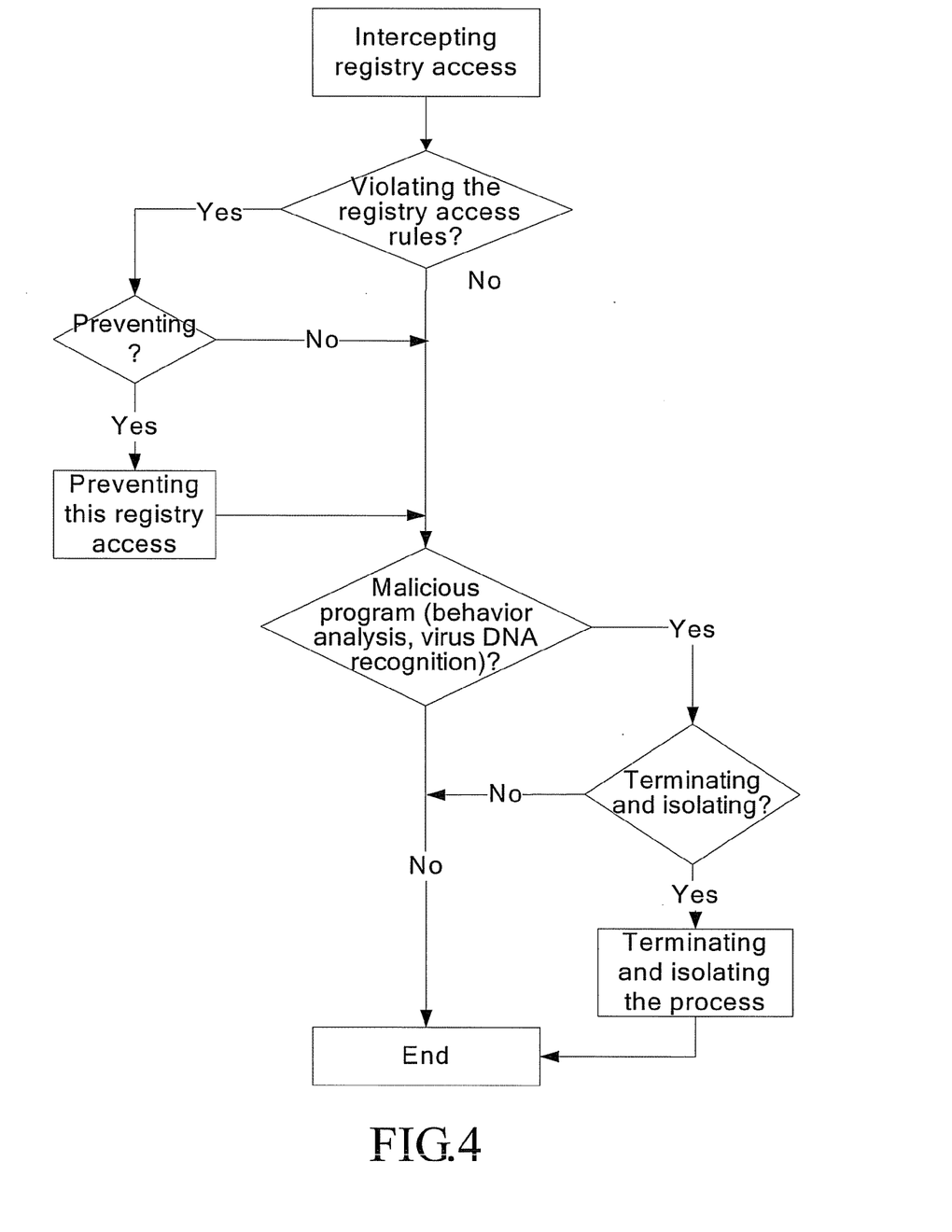
FIGS. 4 and 5 illustrate flow charts of a computer automatic protection method in accordance with the present invention when an object program attempts to access a registry and call a system key API function, respectively.
Figure 5:
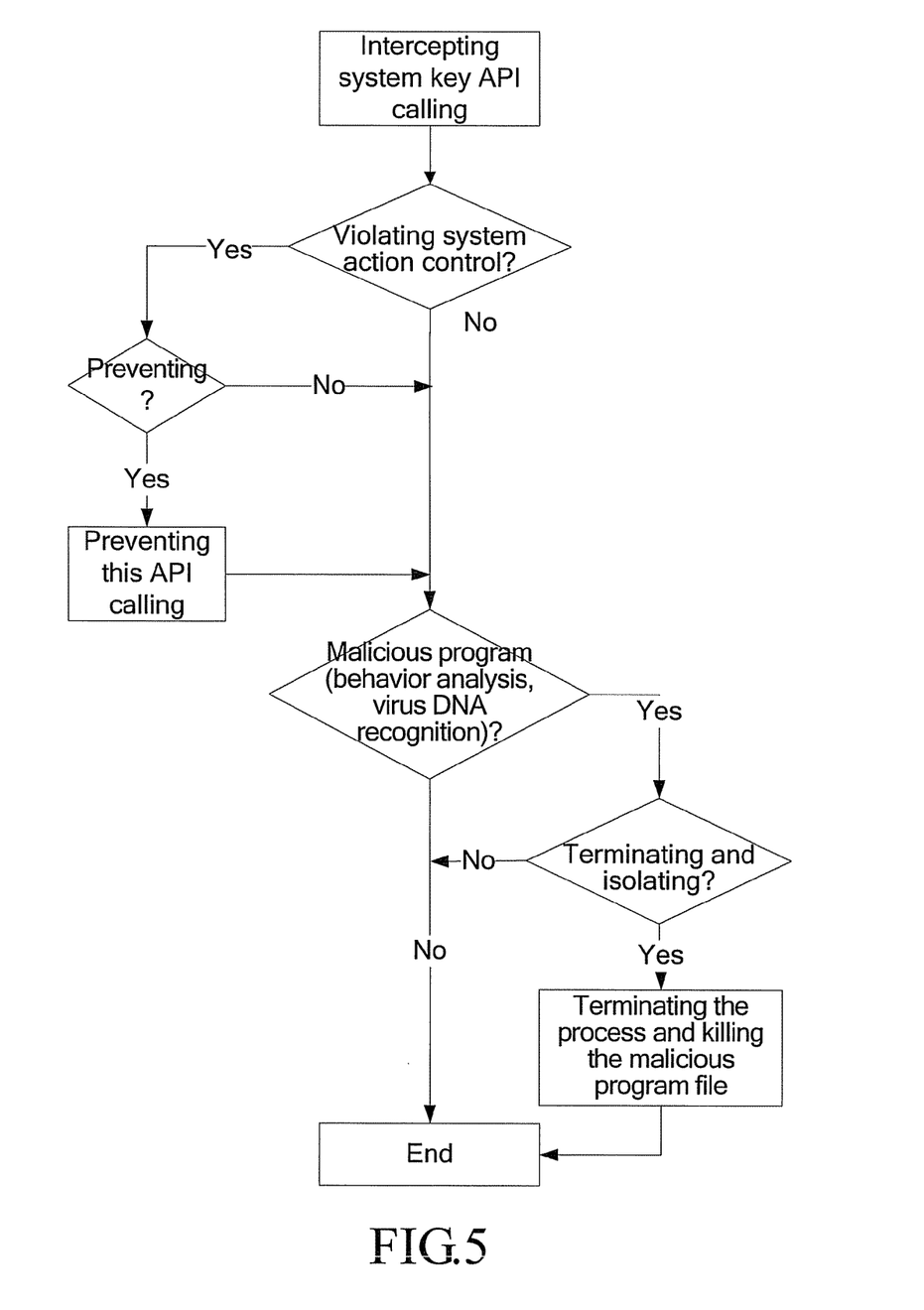

FIGS. 4 and 5 illustrate flow charts of a computer automatic protection method in accordance with the present invention when an object program attempts to access a registry and call a system key API function, respectively. As illustrated, the processing procedures of FIGS. 4 and 5 are similar to that of FIG. 3, the only difference is that they trigger different resource access control rules, such as a registry access rule and system key API function call rule, and prevent different corresponding actions according to different operations that being attempted to start, for example, prevent registry access and prevent API calling. For the same portion of FIGS. 4 and 5 as FIG. 3, it may refer to the specific description of FIG. 3 and the detailed explanation thereof is omitted herein.

In the procedure described above, many determination results may be obtained after the malicious behavior analysis determination, resource access scanning or manual scanning are performed. The determination results may be divided into two types based on the accuracy of the determination results: (1) inaccurate determination result which includes the determination result from the malicious behavior analysis determination; (2) accurate determination result which includes the determination result from the resource access scanning and manual scanning. Different resource access rules corresponding to different determination results may be generated. For example, a resource access rule that restricts the starting of a malicious program file may be generated for the inaccurate determination result; and a resource access rule that restricts the access to a virus file may be generated for the accurate determination result. The resource access rule that restricts the starting of the program file may be generated as needed for the accurate determination result.

An automatic updating procedure of the resource access rules of the computer automatic protection method in accordance with the present invention will be described in details for the two types of different determination results described above.

In Case of the Inaccurate Determination Result

Figure 6:
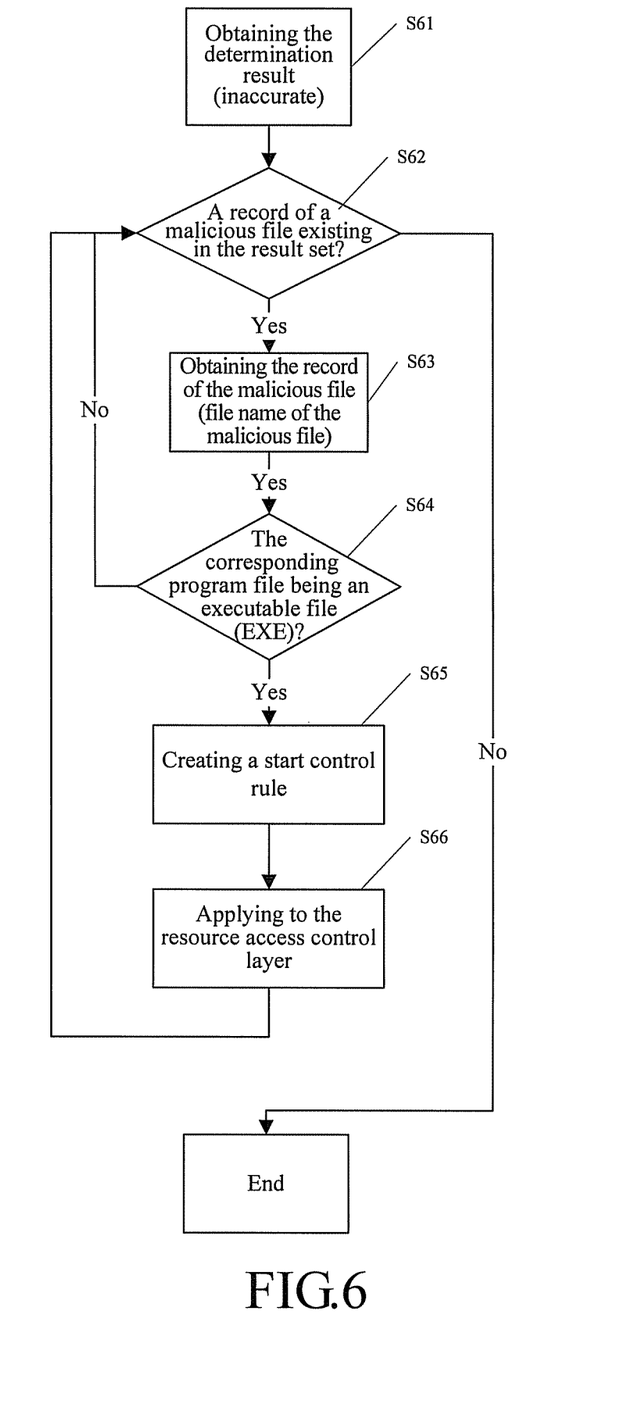
FIG. 6 illustrates an automatic updating procedure of resource access rules based on the inaccurate determination result.

FIG. 6 illustrates an automatic updating procedure of resource access rules based on the inaccurate determination result.

As shown in FIG. 6, in step S61, after malicious behavior analysis determination is performed for the object program, the determination result is obtained to get a determination result set, which is an inaccurate determination result. When the determination result is obtained, some of files which are determined to be malicious programs or files released by the malicious programs may have been killed during the aforementioned resource scanning or malicious behavior analysis processing. A corresponding rule is not needed to be created for such non-existing files any more. Therefore, it is determined whether a record of a malicious file exists in the result set in the following step (step S62). If it does not exist, the procedure ends directly and no more rules will be added.

In general, the malicious program determined by one determination result may be not just a program file, but it may involve a number of files contained in a set of processes. These files may be such files that correspond to one or more processes created by the malicious program, or files released by the processes. In this embodiment, in order to reduce false alarm, a corresponding new resource access rule is created for only an executable file, i.e., an EXE file, which exists in the determination result set. Thus, when it is determined that the result set includes the record of the malicious file in step S62, information of the malicious file, such as file name, is obtained from the record of the malicious file (step S63), then it is determined whether the file is an EXE file (step S64). If the determination result is Yes, the procedure proceeds to step S65, in which a new rule is created. Otherwise, the procedure returns to step S62, in which it proceeds to obtain other malicious files in the result set.

In step S65, the associated resource access rule, for example, the content of which is "any program being not allowed to start the program file", is created based on information of the extracted malicious EXE file, and the newly created rule is added to the existing resource access rules to make it become effective (step S66).

Finally, after the existing resource access rules are updated automatically, the procedure returns to step S62 to proceed, until corresponding resource access rules are created for all the malicious files in the result set.

In Case of the Accurate Determination Result

Figure 7:
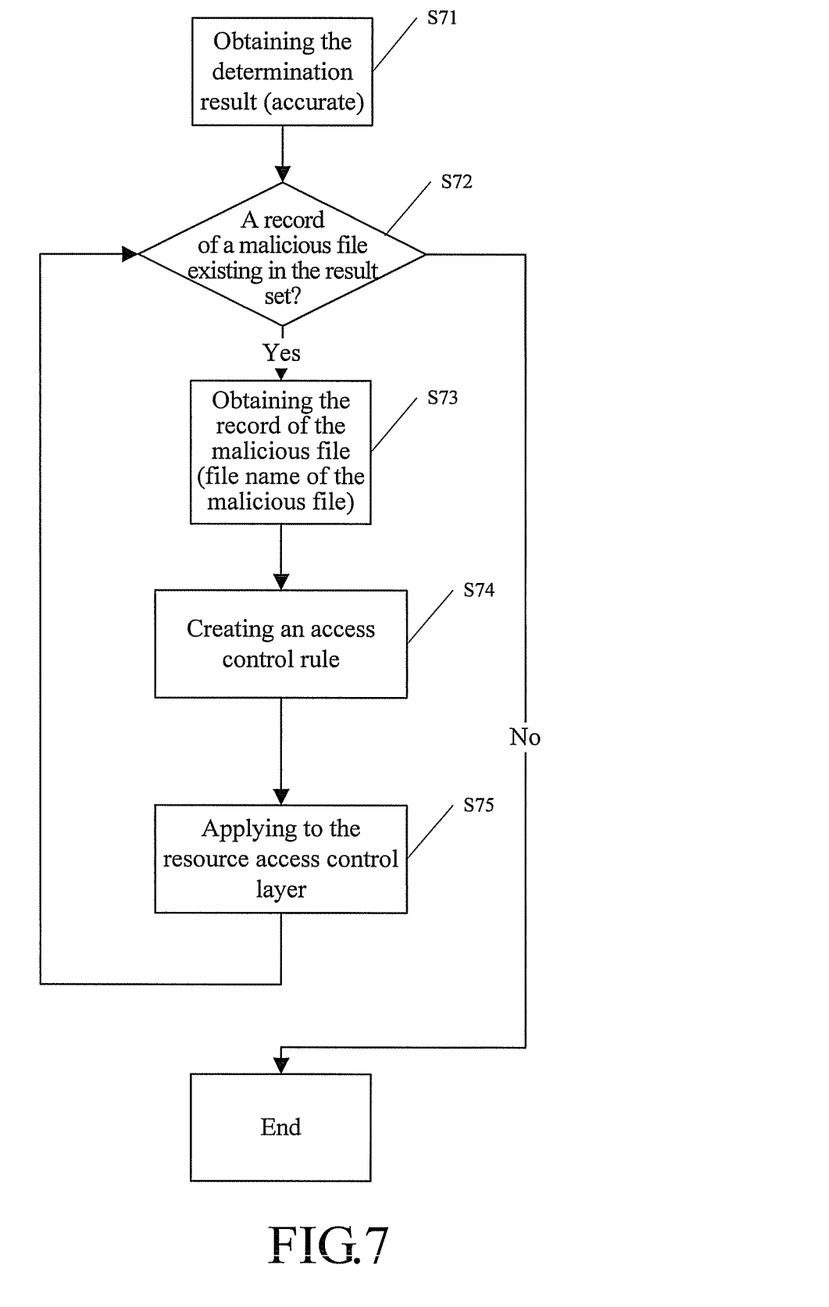
FIG. 7 illustrates an automatic updating procedure of resource access rules based on the accurate determination result.

FIG. 7 illustrates an automatic updating procedure of resource access rules based on the accurate determination result, i.e., the determination result of resource scanning and manual scanning.

The procedure shown in FIG. 7 is similar to that in FIG. 6, the difference is in that: as the determination result after the scanning is accurate, all the virus files determined in the determination result are required to be prohibited from being accessed when the rule is created. For this end, the step in FIG. 6, in which it is determined whether the malicious file is an EXE file, is omitted in the automatic updating procedure shown in FIG. 7, while a corresponding resource access rule is created directly (step S74) for each virus file (step S72). In the example shown in FIG. 7, the resource access rule created for the virus file is "any program being not allowed to access the program file". Therefore, it protects any program from virus infection due to its access to the determined virus file. FIG. 6 may be referred for specific operations of steps S71, S73 and S75 in FIG. 7 which are similar to the corresponding steps in FIG. 6, and therefore the detail description thereof is omitted.

The computer automatic protection method in accordance with the present invention is described in details hereinabove in conjunction with the accompanying figures. The method may be implemented by computer software, computer hardware or a combination thereof.

Figure 8:
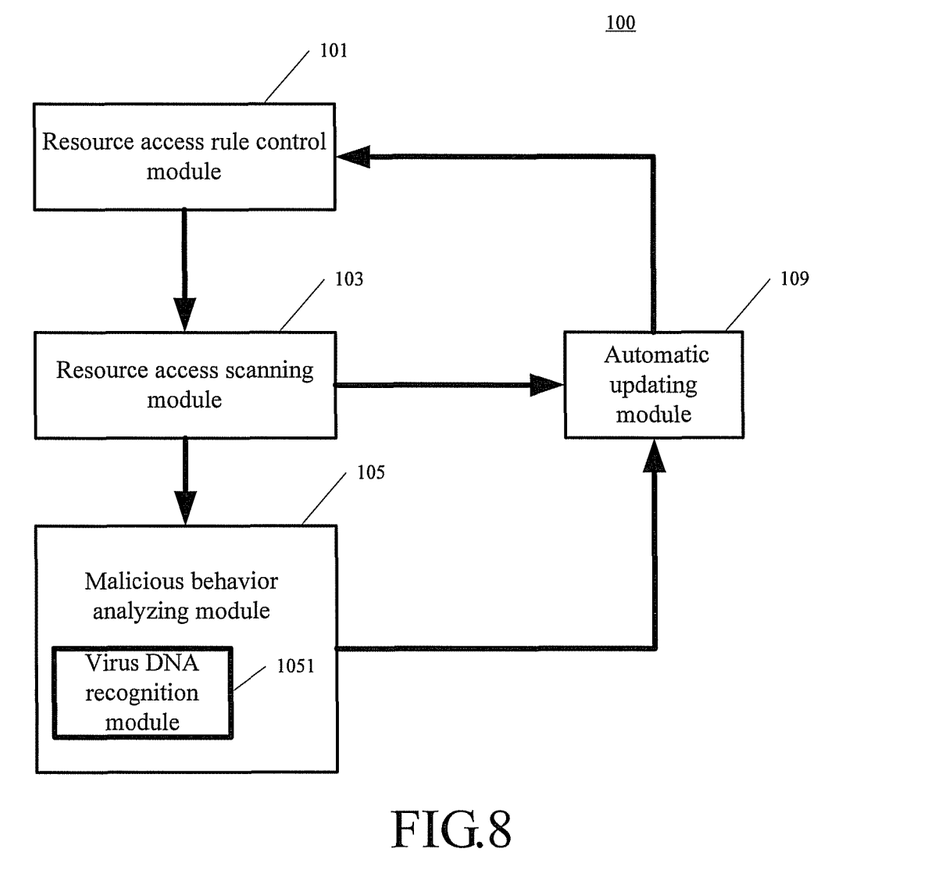
FIG. 8 illustrates a block diagram of a device for automatically protecting a computer against a harmful program in accordance with an embodiment of the present invention.

FIG. 8 illustrates a block diagram of a computer automatic protection device 100 in accordance with an embodiment of the present invention, where the same components as those in the conventional computer system are omitted in this figure.

As illustrated in FIG. 8, the computer automatic protection device 100 includes a resource access rule control module 101 configured to restrict an object program from accessing some resources in a computer system based on predetermined resource access rules; a resource access scanning module 103 configured to scan computer resources accessed by the object program to determine whether the accessed computer resources are infected by the object program; a malicious behavior analyzing module 105 configured to analyze malicious behaviors based on behavior characteristics of the object program to determine whether the object program is a harmful program, and an automatic updating module 109 configured to create a new resource access rule based on the determination results of the resource access scanning and the malicious behavior analysis, and add the new resource access rule to the existing resource access control layer to implement automatic update. The malicious behavior analyzing module 105 may further include a virus "DNA" recognition module 1051 configured to determine the object program again using the virus "DNA" recognition technology after the object program is determined by the malicious behavior analyzing module 105 to be harmful. The object program is determined to be harmful only when both determination result of the malicious behavior analyzing module 105 and the determination result of the virus "DNA" recognition module 1051 are harmful.

Beneficial Effect

To sum up, the method and apparatus for automatically protecting computers against harmful programs in accordance with the present invention combines resource access control with resource access scanning and malicious behavior analysis to automatically protect computers against harmful programs using a three-layer structure including the resource access control, resource access scanning and malicious behavior analysis, such that restriction priority of the resource access rule control layer, timeliness and accuracy of the resource access scanning and fuzzy decision of the malicious behavior analysis can be fully utilized to solve the problem of "lagging" existing in the traditional "signature scanning" technologies.

Meanwhile, the method and apparatus for automatically protecting computers against harmful programs in accordance with the present invention also has a resource access rule automatic updating function, and therefore may implement automatic adding of a resource access rule without user's participation. As a result, the difficulty in using the resource access rule control layer is decreased and the ability in automatically protecting the computer against a harmful program is improved.

In addition, owing to the combination of the malicious behavior analysis with the virus "DNA" recognition technology, the virus "DNA" recognition technology is used for further confirmation when possible malicious behaviors occur, such that unknown viruses can be discovered by the malicious behavior analysis while false alarm can be appropriately prevented by means of the virus "DNA" recognition technology and false alarm rate is decreased.

It should be understood by those skilled in the art that various modifications may be made to the method and apparatus for automatically protecting computers against harmful programs disclosed in the present invention without departing from the content of the present invention. Therefore, the protection scope of the present invention should be defined by the content of the appended claims.

What is claimed is:

1. A method for automatically protecting a computer, comprising:
   restricting an object program from accessing some resources in a computer system based on predetermined resource access rules;
   scanning computer resources accessed by the object program to determine whether the accessed computer resources are infected by the object program;
   analyzing malicious behaviors based on behavior characteristics of the object program to determine whether the object program is a harmful program;
   creating a new resource access rule based on results of the scanning step, the analyzing step, or both, wherein when the analyzing step determines that the object program is a harmful program, the created new resource access rule includes instructions for disallowing a program file associated with the harmful object program from being started by any program; and
   automatically adding the new resource access rule created to the predetermined resource access rules.

2. The method according to claim 1, wherein the step of creating the new resource access rule comprises:
   when the step of scanning the computer resources determines that the accessed computer resources are infected, the created new resource access rule includes instructions for disallowing the infected computer resources from being accessed by any program.

3. The method according to claim 1, wherein the program file associated with the harmful object program is an executable program file.

4. The method according to claim 1, further comprising:
   performing, by a user, manual scanning to scan and kill virus files existing in the computer system and files infected by viruses; and
   the step of creating the new resource access rule further comprises creating the new resource access rule based on the result of the manual scanning.

5. The method according to claim 4, wherein the created new resource access rule comprises:
   instructions for disallowing the virus files found out by the manual scanning or the files infected by viruses from being accessed by any program.

6. The method according to claim 1, wherein the step of analyzing the malicious behaviors further comprises:
   if the step of analyzing the malicious behaviors determines that the object program is a harmful program, analyzing the object program using a virus "DNA" recognition technology; and
   determining that the object program is a harmful program when the object program is determined to be a harmful program by both the malicious behavior analysis and the virus "DNA" recognition technology.

7. The method according to claim 1, wherein the predetermined resource access rules include at least one of file access rules, process start control rules, registry access rules and system action rules.

8. The method according to claim 7, wherein the step of restricting an object program from accessing some resources further comprises:
   prompting the user to decide whether to prevent the access of the object program when it is determined that the object program have accessed the resources which are determined to be prohibited from being accessed in the resource access rules; and
   proceeding to the step of analyzing the malicious behaviors after the object program is prevented according to user's decision.

9. The method according to claim 8, further comprising:
   proceeding to the step of scanning the computer resources if the user decides not to prevent the object program.

10. An apparatus comprising:
    a processor, wherein the processor is configured to:
    restrict an object program from accessing some resources in a computer system based on predetermined resource access rules;
    scan computer resources accessed by the object program to determine whether the accessed computer resources are infected by the object program; and
    analyze malicious behaviors based on behavior characteristics of the object program to determine whether the object program is a harmful program;
    create a new resource access rule based on results of scanning the computer resources, analyzing the malicious behaviors, or both, wherein when the analyzing determines that the object program is a harmful program, the created new resource access rule includes instructions for disallowing a program file associated with the harmful object program from being started by any program; and
    automatically add the created new resource access rule to the predetermined resource access rules.

11. The apparatus according to claim 10, wherein:
    when the scanning of the computer resources determines that the accessed computer resources are infected, the created new resource access rule includes instructions for disallowing the infected computer resources from being accessed by any program.

12. The apparatus according to claim 10, wherein the processor is further configured to:
    analyze the object program using a virus "DNA" recognition technology after the object program is determined to be a harmful program by analyzing of the malicious behaviors, wherein
    the object program is determined to be a harmful program only when the object program is determined to be a harmful program by both the analyzing of the malicious behaviors and the virus "DNA" recognition technology.

* * * * *

UNITED STATES PATENT AND TRADEMARK OFFICE
CERTIFICATE OF CORRECTION

| | |
|---|---|
| PATENT NO. | : 8,561,192 B2 |
| APPLICATION NO. | : 12/738023 |
| DATED | : October 15, 2013 |
| INVENTOR(S) | : Chao Ye |

It is certified that error appears in the above-identified patent and that said Letters Patent is hereby corrected as shown below:

On title page, item 73 Assignees
      replace "Beijing Rising Information Technology Co., Ltd. (Beijing, CN); Beijing Rising International Software Co., Ltd. (Beijing, CN)"
      with --Beijing Rising Information Technology Co., Ltd. (Beijing, CN)--.

Signed and Sealed this
Eighteenth Day of March, 2014

Michelle K. Lee
*Deputy Director of the United States Patent and Trademark Office*